US012734790B2

(12) United States Patent
Sato et al.

(10) Patent No.: US 12,734,790 B2
(45) Date of Patent: Sep. 15, 2026

(54) MULTI-LAYERED STRUCTURE AND METHOD FOR PRODUCING SAME

(71) Applicant: Nitto Denko Corporation, Osaka (JP)

(72) Inventors: Keisuke Sato, Osaka (JP); Takeshi Murashige, Osaka (JP); Junichi Inagaki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 330 days.

(21) Appl. No.: 18/036,049

(22) PCT Filed: Oct. 26, 2021

(86) PCT No.: PCT/JP2021/039465

§ 371 (c)(1), (2) Date: May 9, 2023

(87) PCT Pub. No.: WO2022/102396

PCT Pub. Date: May 19, 2022

(65) Prior Publication Data

US 2024/0001644 A1 Jan. 4, 2024

(30) Foreign Application Priority Data

Nov. 13, 2020 (JP) ................................ 2020-189244

(51) Int. Cl.

| | |
|---|---|
| ***B32B 17/10*** | (2006.01) |
| ***B32B 7/12*** | (2006.01) |
| ***B32B 38/10*** | (2006.01) |
| ***B32B 43/00*** | (2006.01) |

(52) U.S. Cl.

CPC .......... *B32B 17/10458* (2013.01); *B32B 7/12* (2013.01); *B32B 17/10018* (2013.01); *B32B 38/10* (2013.01); *B32B 43/003* (2013.01); *B32B 2250/02* (2013.01); *B32B 2307/7376* (2023.05)

(58) Field of Classification Search

None

See application file for complete search history.

(56) References Cited

U.S. PATENT DOCUMENTS

2015/0165548 A1 6/2015 Marjanovic et al.
2016/0288249 A1 10/2016 Ciou et al.
2016/0315293 A1 10/2016 You et al.

(Continued)

FOREIGN PATENT DOCUMENTS

CN 106064275 11/2016
JP 2006-309033 11/2006

(Continued)

OTHER PUBLICATIONS

Japan, Notice of Reasons for Refusal received in Japanese Patent Application No. 2020-189244, dated Oct. 1, 2024.

(Continued)

*Primary Examiner* — Samir Shah

(74) *Attorney, Agent, or Firm* — GREENBLUM & BERNSTEIN, P.L.C.

(57) ABSTRACT

The present multi-layered structure includes: a resin layer; a glass layer stacked via an adhesive layer on the resin layer; and a fusion layer that is formed in an outer peripheral portion of the glass layer on the glass layer side that faces the adhesive layer. A thickness of the glass layer is 10 μm or more and 300 μm or less. A thickness of the fusion layer is less than 3 μm.

9 Claims, 12 Drawing Sheets

(56) References Cited

U.S. PATENT DOCUMENTS

| | | | |
|---|---|---|---|
| 2018/0057390 | A1 | 3/2018 | Hackert et al. |
| 2020/0353567 | A1 | 11/2020 | Matsuo |
| 2022/0080530 | A1 | 3/2022 | Kishi et al. |

FOREIGN PATENT DOCUMENTS

| | | |
|---|---|---|
| JP | 2006-317560 | 11/2006 |
| JP | 2006-328329 | 12/2006 |
| JP | 2006-328334 | 12/2006 |
| JP | 2006-337491 | 12/2006 |
| JP | 2006-337492 | 12/2006 |
| JP | 2006-337493 | 12/2006 |
| JP | 2006-337569 | 12/2006 |
| JP | 2007-9182 | 1/2007 |
| JP | 2009-161744 | 7/2009 |
| JP | 2010-284840 | 12/2010 |
| JP | 2012-73580 | 4/2012 |
| JP | 2013-157545 | 8/2013 |
| JP | 2013-231744 | 11/2013 |
| JP | 2016-193814 | 11/2016 |
| JP | 2016-203257 | 12/2016 |
| JP | 2018-519229 | 7/2018 |
| KR | 10-2020-0105827 | 9/2020 |
| TW | 201536461 | 10/2015 |
| TW | 201638033 | 11/2016 |
| TW | 201703912 | 2/2017 |
| TW | 201936309 | 9/2019 |
| WO | 2019/138967 | 7/2019 |
| WO | 2020/153178 | 7/2020 |

OTHER PUBLICATIONS

Extended European Search Report issued in EP Application No. 21891643.5, dated Mar. 14, 2024.

Tawain, Office Action received in TW patent application No. 110140377, dated Apr. 9, 2025, and English language translation thereof.

International Search Report issued in International Patent Application No. PCT/JP2021/039465, dated Dec. 28, 2021.

Written Opinion issued in International Patent Application No. PCT/JP2021/039465, dated Dec. 28, 2021.

China, Office Action received in CN Application No. 202180089805.6, dated Jul. 18, 2025, and English language translation thereof.

Korea, Request for the Submission of an Opinion received in KR Application No. 10-2023-7019364, dated Mar. 18, 2026, and English translation.

China, Second Office Action received in CN Application No. 202180089805.6 dated Mar. 7, 2026, and English Translation.

MULTI-LAYERED STRUCTURE AND METHOD FOR PRODUCING SAME

TECHNICAL FIELD

The present invention relates to a multi-layered structure and a method for producing the multi-layered structure.

BACKGROUND ART

A multi-layered structure including two or more stacked layers is known. One exemplary multi-layered structure includes a glass layer having a thin plate thickness (glass film) and a silver reflective layer stacked thereon. The thickness of this multi-layered structure is, for example, within the range of from 1.0 through 200 μm. This multi-layered structure is obtained, for example, from a glass roll formed through a down-draw process.

PRIOR ART DOCUMENTS

Patent Documents

[Patent Document 1] Japanese Patent Application Publication No. 2013-231744

SUMMARY OF THE INVENTION

Problem to be Solved by the Invention

The above glass layer having a thin plate thickness is very brittle, and thus readily forms cracks. Also, in view of poor handling property thereof, proposed is, for example, a multi-layered structure that is improved in handling property through reinforcement by attaching a resin layer to one side of a glass layer.

However, the multi-layered structure formed by stacking the thin glass layer on the resin layer still involves the drawback of readily forming cracks in the glass layer.

The present invention has been accomplished in view of the above, aiming to provide a multi-layered structure that does not readily form cracks in a glass layer.

Means for Solving the Problem

The present multi-layered structure includes: a resin layer; a glass layer stacked via an adhesive layer on the resin layer; and a fusion layer that is formed in an outer peripheral portion of the glass layer on a glass layer side that faces the adhesive layer. A thickness of the glass layer is 10 μm or more and 300 μm or less. A thickness of the fusion layer is less than 3 μm.

Advantageous Effects of the Invention

According to a disclosed technique, it is possible to provide a multi-layered structure that does not readily form cracks in a glass layer.

MODE FOR CARRYING OUT THE INVENTION

Figure 1:
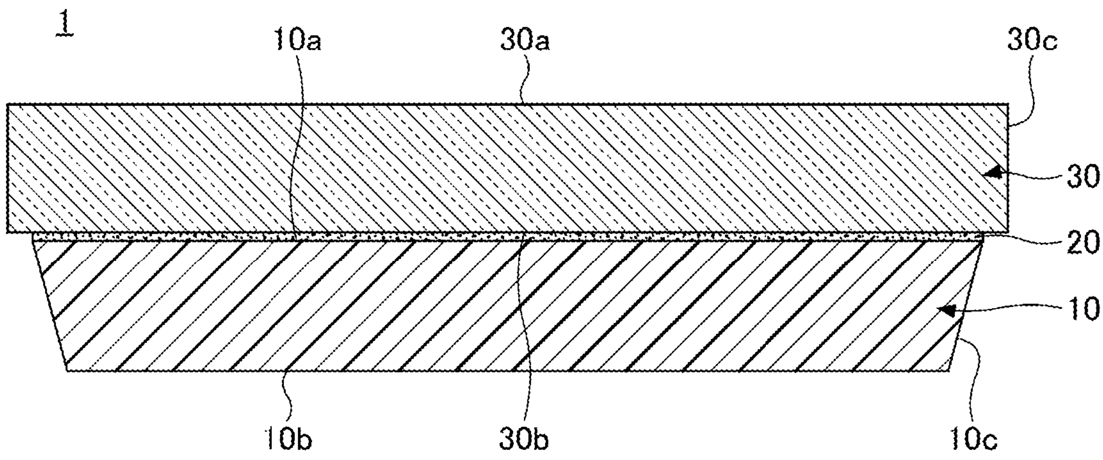
FIG. 1 is a cross-sectional view illustrating a multi-layered structure according to a first embodiment.

Hereinafter, referring to the drawings, modes for carrying out the invention will be described. In the drawings, the same components are given the same symbols, and duplicate description thereof may be omitted.

First Embodiment

[Multi-Layered Structure]

Figure 2:
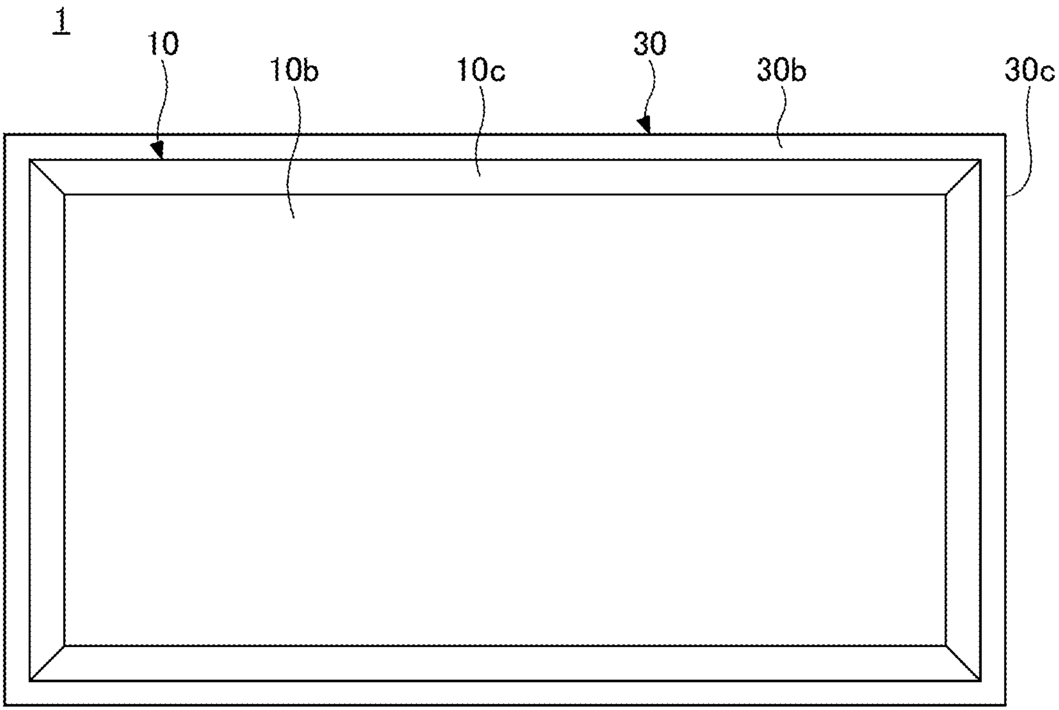
FIG. 2 is a bottom view illustrating the multi-layered structure according to the first embodiment.

FIG. 1 is a cross-sectional view illustrating the multi-layered structure according to the first embodiment. FIG. 2 is a bottom view illustrating the multi-layered structure according to the first embodiment, with the multi-layered structure being viewed from the bottom face of the resin layer.

As illustrated in FIG. 1 and FIG. 2, the multi-layered structure 1 includes a resin layer 10, an adhesive layer 20, and a glass layer 30. The resin layer 10 has a top face 10*a*, a bottom face 10*b*, and a side face 10*c*. The glass layer 30 has a top face 30*a*, a bottom face 30*b*, and a side face 30*c*. In the multi-layered structure 1, the glass layer 30 is stacked via the adhesive layer 20 on the top face 10*a* of the resin layer 10. In other words, the adhesive layer 20 adheres the top face 10*a* of the resin layer 10 to the bottom face 30*b* of the glass layer 30.

A planar shape of the multi-layered structure 1 (a shape thereof as viewed from a direction normal to the top face 30*a* of the glass layer 30) is, for example, a rectangular shape. However, the planar shape thereof is not limited thereto. The planar shape of the multi-layered structure 1 can be circular, oval, a combination thereof, or another appropriate shape.

Since the multi-layered structure 1 has flexibility, the multi-layered structure 1 can be readily adhered to a curved plane.

In the present embodiment, as one example, the planar shape of the multi-layered structure 1 is a rectangular shape. Specifically, in the present embodiment, as one example, the planar shape of the resin layer 10 is a rectangular shape, and the planar shape of the glass layer 30 is a rectangular shape that is larger than that of the resin layer 10. Also, the side face 10*c* of the resin layer 10 is an oblique face that forms an angle of less than 90 degrees with the top face 10*a* of the resin layer 10. In other words, a cross-sectional shape of the resin layer 10 is a trapezoidal shape. Also, a cross-sectional shape of the glass layer 30 is a rectangular shape. In a bottom view, the outer peripheral portion of the bottom face 30*b* of the glass layer 30 is exposed around the side face 10*c* of the resin layer 10.

In accordance with a production method of the multi-layered structure 1, however, the resin layer 10 and the glass layer 30 may be the same in size in the bottom view. Alternatively, in the bottom view, the outer peripheral portion of the bottom face 30*b* of the glass layer 30 may be exposed at only one side of the resin layer 10, or the outer peripheral portion of the bottom face 30*b* of the glass layer 30 may be exposed at two sides or three sides of the resin layer 10. Also, the entirety of the side face 10*c* is not necessarily an oblique face, and a part of the side face 10*c* may be substantially perpendicular to the top face 10*a* or the bottom face 10*b*.

Figure 3:
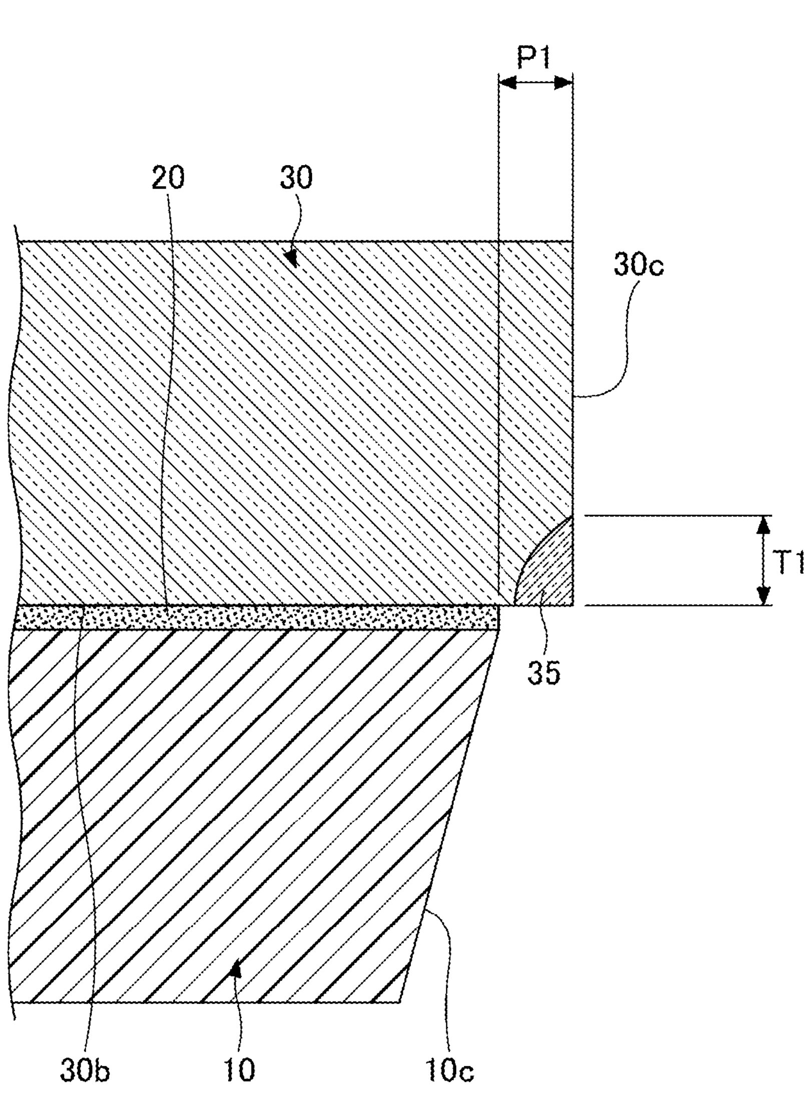
FIG. 3 is a partially enlarged cross-sectional view of an outer peripheral portion and its vicinity of the multi-layered structure according to the first embodiment.

FIG. 3 is a partially enlarged cross-sectional view of the outer peripheral portion and its vicinity of the multi-layered structure according to the first embodiment. As illustrated in FIG. 3, the fusion layer 35 may be formed in the outer peripheral portion of the glass layer 30 on the glass layer 30 side facing the adhesive layer 20. The fusion layer 35 may be formed annularly over the entirety of the outer peripheral portion of the glass layer 30. A cross-sectional shape of the fusion layer 35 is, for example, a fan shape. The fusion layer 35 is continuously exposed on the bottom face 30*b* and the side face 30*c* of the glass layer 30. A thickness T1 of the fusion layer 35 is less than 3 μm.

The thickness T1 of the fusion layer 35 is a value of the thickest portion of the fusion layer 35 when the thickness of the fusion layer 35 is measured in a perpendicular direction to the bottom face 30*b*, with the bottom face 30*b* of the glass layer 30 being a reference. The thickness T1 of the fusion layer 35 does not reach 3 μm at any measurement position in the side face 30*c* of the glass layer 30. The thickness T1 of the fusion layer 35 can be measured through, for example, microscopic observation. Alternatively, the thickness T1 of the fusion layer 35 can also be measured by use of the Senarmont method.

Note that, the thickness T1 of the fusion layer 35 may be 0 μm as long as the thickness T1 is less than 3 μm. In other words, the fusion layer 35 may be absent. The fusion layer 35 is a layer that is formed when the resin layer 10 is irradiated with laser light during the production process of the multi-layered structure 1. However, the fusion layer 35 may be completely removed during the production process of the multi-layered structure 1. In this case, the thickness T1 of the fusion layer 35 becomes 0 μm. The production process of the multi-layered structure 1 will be described below.

Also, in the multi-layered structure 1, the outer peripheral portion of the glass layer 30 projects, in a horizontal direction, from the top-end portion of the side face 10*c* of the resin layer 10. An amount of projection P1 of the outer peripheral portion of the glass layer 30 from the top-end portion of the side face 10*c* of the resin layer 10 is preferably less than 15 μm. When the amount of projection P1 is less than 15 μm, the thickness T1 of the fusion layer 35 can be made further thinner. Note that, the amount of projection P1 may be 0 μm. In other words, in a plan view, the outer edge of the resin layer 10 may match the outer edge of the glass layer 30.

Here, materials and the like of the portions of the multi-layered structure 1 will be described.

[Resin Layer]

The resin layer 10 is a layer having flexibility that serves as a base material on which the glass layer 30 and other layers are to be stacked. The resin layer 10 is a single layer or includes a plurality of layers. When the resin layer 10 includes a plurality of layers, the plurality of layers are preferably stacked via a tacky layer having an adhesive function. From the viewpoint of flexibility thereof, the total thickness of the resin layer 10 may be 20 μm or more and 1000 μm or less, and is preferably in the range that is 25 μm or more and 500 μm or less, and more preferably 50 μm or more and 200 μm or less. When the resin layer 10 is a single layer, the thickness of the resin layer 10 may be, for example, in the range that is 30 μm or more and 50 μm or less.

Examples of a material of the resin layer 10 include: polyester-based resins such as polyethylene terephthalate-based resins and polyethylene naphthalate-based resins; cycloolefin-based resins such as norbornene-based resins; polyethersulfone-based resins; polycarbonate-based resins; acrylic resins; polyolefin-based resins; polyimide-based resins; polyamide-based resins; polyimideamide-based resins; polyarylate-based resins; polysulfone-based resins; polyetherimide-based resins; cellulose-based resins; and urethane-based resins.

[Adhesive Layer]

As the adhesive layer 20, a given appropriate adhesive is used. A thickness of the adhesive layer 20 is, for example, 0.5 μm or more and 25 μm or less. As the adhesive layer 20, for example, acrylic tacky agents, silicone-based tacky agents, rubber-based tacky agents, UV curable acrylic adhesives, UV curable epoxy-based adhesives, thermosetting epoxy-based adhesives, thermosetting melamine-based adhesives, thermosetting phenol-based adhesives, ethylene-vinyl acetate (EVA) intermediate membranes, polyvinyl butyral (PVB) intermediate membranes, and the like can be used.

Note that, in the present specification, the tacky agent refers to a layer that has adhesiveness at normal temperature and is to be adhered to an adherend with a low pressure. Therefore, even when the adherend attached to the tacky agent is removed, the tacky agent maintains a sufficiently applicable tacky force. Meanwhile, the adhesive refers to a layer that can bond materials by intervening between the materials. Therefore, when the adherend attached to the adhesive is removed, the adhesive no longer maintains a sufficiently applicable adhesive force.

[Glass Layer]

No particular limitation is imposed on the glass layer 30, and appropriate glass can be selected in accordance with the intended purpose. From the viewpoint of classification based on composition, examples of the glass layer 30 include soda lime glass, borate glass, aluminosilicate glass, and quartz glass. Alternatively, from the viewpoint of classification based on alkali components, examples thereof include alkali-free glass and low alkali glass. The content of an alkali metal component (e.g., $Na_2O$, $K_2O$, and $Li_2O$) in the above glass is preferably 15% by weight or less and further preferably 10% by weight or less.

Considering surface hardness, gas tightness, and corrosion resistance of the glass, a thickness of the glass layer 30 is preferably 10 μm or more. Alternatively, since the glass layer 30 desirably has flexibility like a film, the thickness of the glass layer 30 is preferably 300 μm or less. The thickness of the glass layer 30 is further preferably 30 μm or more and 200 μm or less and particularly preferably 50 μm or more and 100 μm or less.

A light transmittance of the glass layer 30 at a wavelength of 550 nm is preferably 85% or higher. A refractive index of the glass layer 30 at a wavelength of 550 nm is preferably from 1.4 through 1.65. A density of the glass layer 30 is preferably from 2.3 g/cm$^3$ through 3.0 g/cm$^3$ and further preferably from 2.3 g/cm$^3$ through 2.7 g/cm$^3$.

No particular limitation is imposed on a forming method of the glass layer 30, and an appropriate method can be selected in accordance with the intended purpose. Typically, the glass layer 30 can be produced by fusing a mixture containing a main raw material (e.g., silica or alumina), a defoamer (e.g., sodium sulfate or antimony oxide), and a reducing agent (e.g., carbon) at a temperature of from about 1400° C. through about 1600° C., followed by forming into a thin plate and then cooling. Examples of the forming method of the glass layer 30 include a slot down-draw process, a fusion process, and a float process. After a glass layer has been formed into a plate through one of these processes, the glass layer in the form of a plate may be made thinner. If necessary, the glass layer may be chemically polished with a solvent (e.g., hydrofluoric acid) in order to have an increased surface smoothness.

Note that, the surface of the glass layer 30 may be provided with a functional layer such as an antifouling layer, an antireflective layer, an electrically conductive layer, a reflection layer, or a decoration layer.

[Method for Producing the Multi-Layered Structure]

Figure 4:
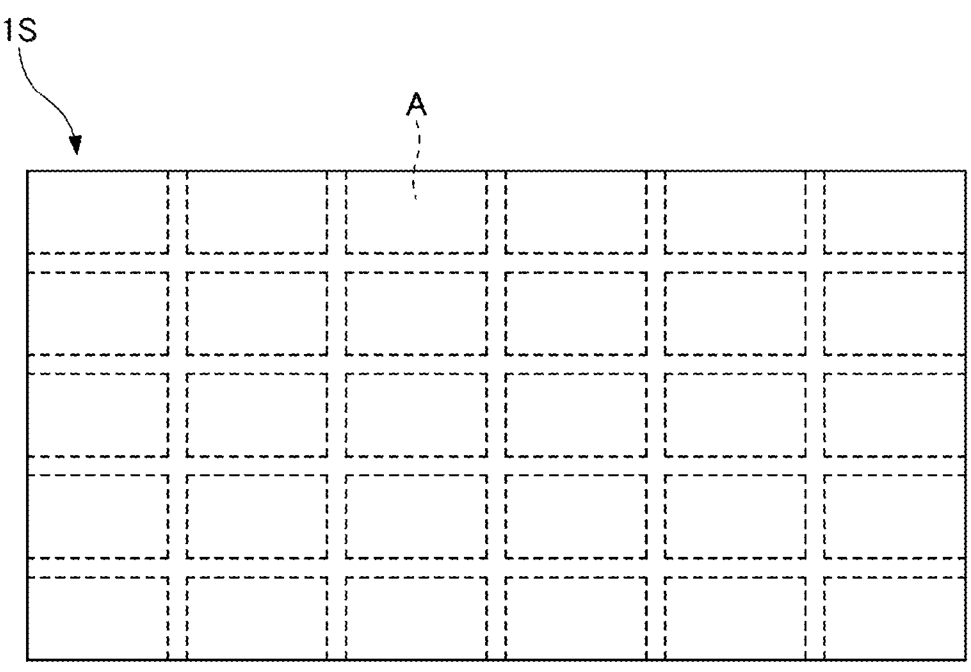
FIG. 4 illustrates a production process of the multi-layered structure according to the first embodiment (part 1).
Figure 5:
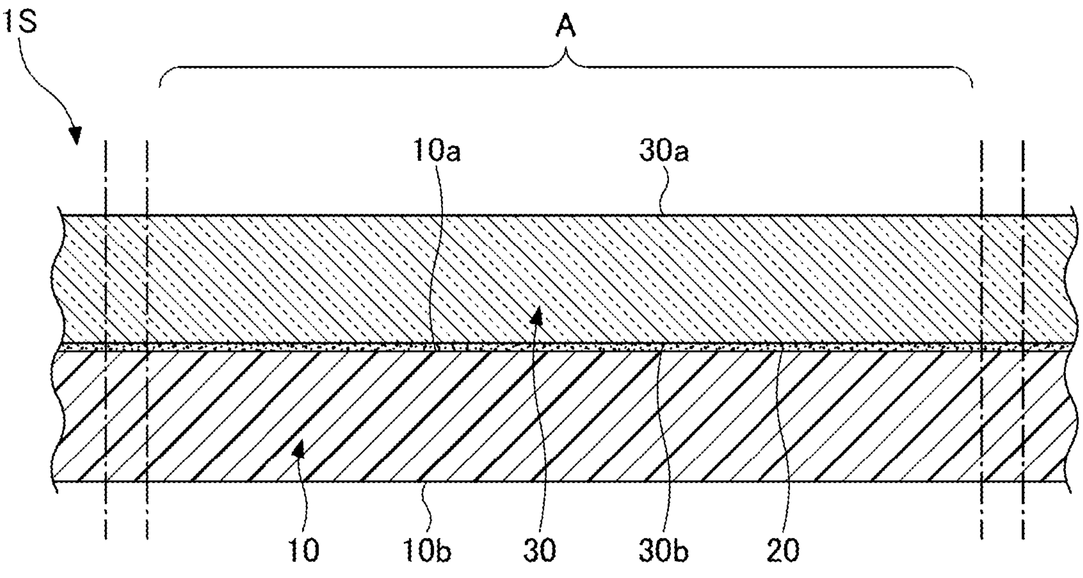
FIG. 5 illustrates a production process of the multi-layered structure according to the first embodiment (part 2).

FIG. 4 to FIG. 9 illustrate a production process of the multi-layered structure according to the first embodiment. Referring to FIG. 4 to FIG. 9, the production process of the multi-layered structure will be described, focusing on a cutting step using a laser. First, as illustrated in FIG. 4 and FIG. 5, a multi-layered structure 1S in the form of a sheet is provided, the multi-layered structure 1S being obtained by stacking the resin layer 10 via the adhesive layer 20 on the glass layer 30. In the multi-layered structure 1S, the thickness of the glass layer 30 is 10 μm or more and 300 μm or less.

For obtaining the multi-layered structure 1S, the resin layer 10 and the glass layer 30 are formed to have predetermined shapes through, for example, stamping, and then the resin layer 10 and the glass layer 30 are stacked via the adhesive layer 20. Alternatively, the resin layer 10 and the glass layer 30 may be continuously stacked via the adhesive layer 20 using a roll-to-roll process, followed by, for example, stamping, thereby separating into individual sections having a given size. Also, the multi-layered structure 1S that has been already completed may be procured.

A plurality of product areas A that are to be the multi-layered structures 1 through separation into individual sections are defined in the multi-layered structure 1S. In the example as illustrated in FIG. 4, the product areas A are arranged vertically and horizontally at predetermined intervals, but this arrangement is not limiting. For example, the product areas A may be arranged one-dimensionally. Note that, FIG. 4 is a plan view, and FIG. 5 is a partially enlarged cross-sectional view illustrating the vicinity including one of the product areas A.

Figure 6:
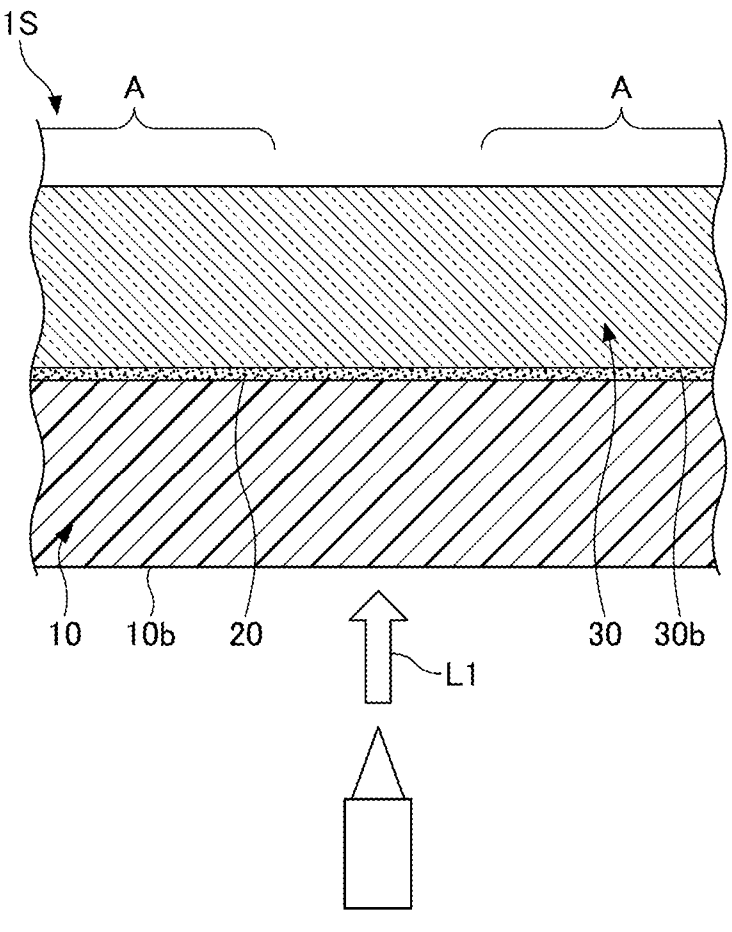
FIG. 6 illustrates a production process of the multi-layered structure according to the first embodiment (part 3).
Figure 7:
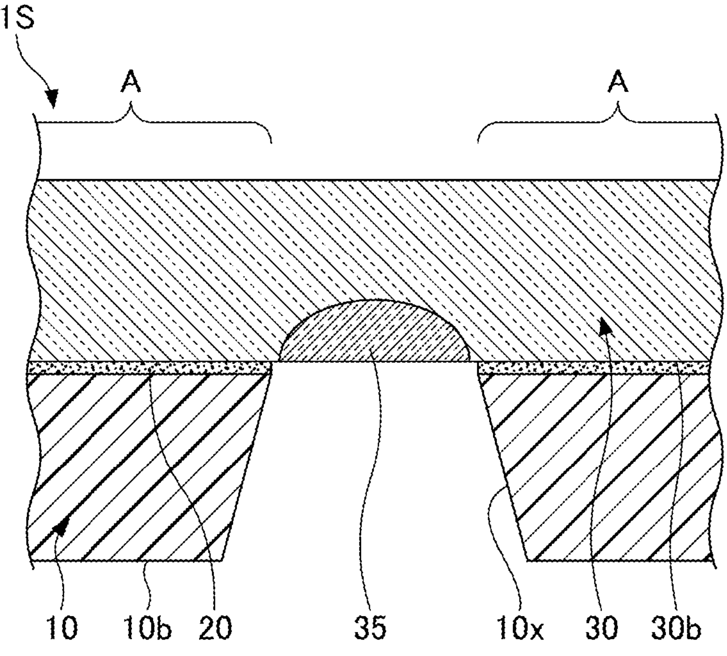
FIG. 7 illustrates a production process of the multi-layered structure according to the first embodiment (part 4).

Next, as illustrated in FIG. 6, the outer peripheral portion of each of the product areas A in the multi-layered structure 1S is irradiated with laser light L1 from a position facing the bottom face 10*b* of the resin layer 10. For example, the outer peripheral portion of each of the product areas A as illustrated in FIG. 4 is sequentially irradiated with the laser light L1 in a lattice form. As illustrated in FIG. 7, the laser light L1 forms, for example, a through-hole 10*x* that penetrates the resin layer 10 and the adhesive layer 20, and the irradiation thereof is performed until the bottom face 30*b* of the glass layer 30 is exposed.

By the irradiation of the laser light L1, the resin layer 10 forms, for example, the through-hole 10*x* of a generally trapezoidal cross-sectional shape having, as a bottom face, the bottom face 30*b* of the glass layer 30. The through-hole 10*x* is formed, in a lattice form, in the outer peripheral portion of each of the product areas A as illustrated in FIG. 4. The width of the widest portion of the through-hole 10*x* (the width of the resin layer 10 on the bottom face 10*b* side) is, for example, from about 40 μm through about 300 μm.

For the irradiation of the laser light L1, for example, a carbon dioxide laser can be used. Note that, although a femtosecond laser may be used for the irradiation of the laser light L1, when color fading of the resin layer 10 due to heat is disadvantageous, a carbon dioxide laser is preferably used because the carbon dioxide laser does not readily cause color fading of the resin layer 10.

Also, the bottom face 30*b* side of the glass layer 30 receives an impact of heat generated by the irradiation of the laser light L1. Therefore, the fusion layer 35 having a predetermined thickness is formed in a thickness direction of the glass layer 30 from the bottom face 30*b* that is exposed to the through-hole 10*x* of the glass layer 30. For example, on the bottom face 30*b* side of the glass layer 30, the fusion layer 35 having a generally semi-circular cross-sectional shape is formed, in a lattice form, in the outer peripheral portion of each of the production areas A as illustrated in FIG. 4.

The fusion layer 35 is a layer that is formed by heat damage due to the irradiation of the laser light L1 from the resin layer 10 side, and has residual stress. Therefore, by cutting a thick portion of the fusion layer 35, cracks are likely to form in the cut portion. The thickness of the thickest portion of the fusion layer 35 is from about 0 μm through about 25 μm. The width of the widest portion of the fusion layer 35 is substantially the same as the width of the narrowest portion of the through-hole 10*x* (the width of the resin layer 10 on the top face 10*a* side).

Figure 8:
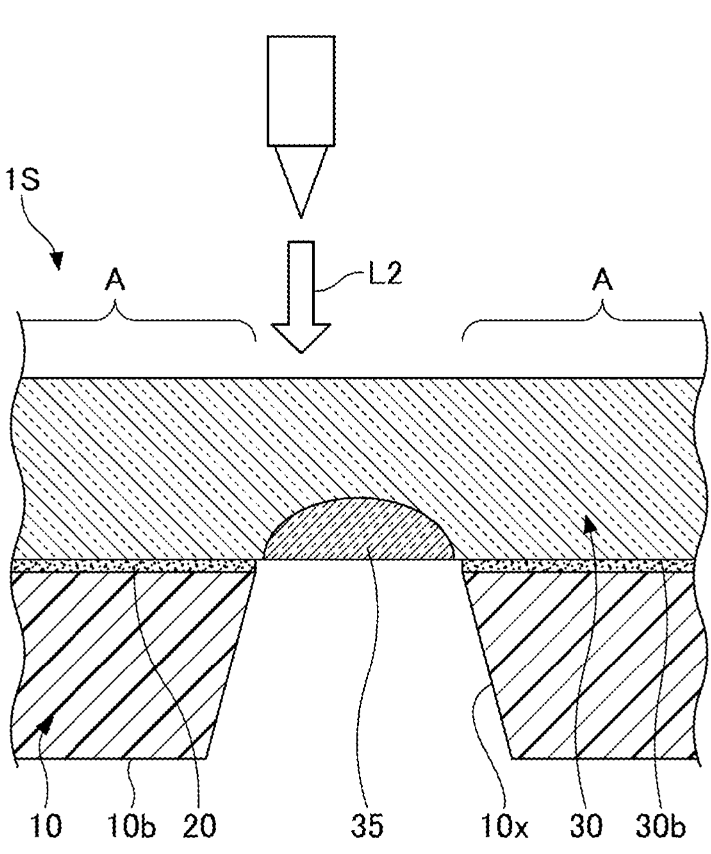
FIG. 8 illustrates a production process of the multi-layered structure according to the first embodiment (part 5).
Figure 9:
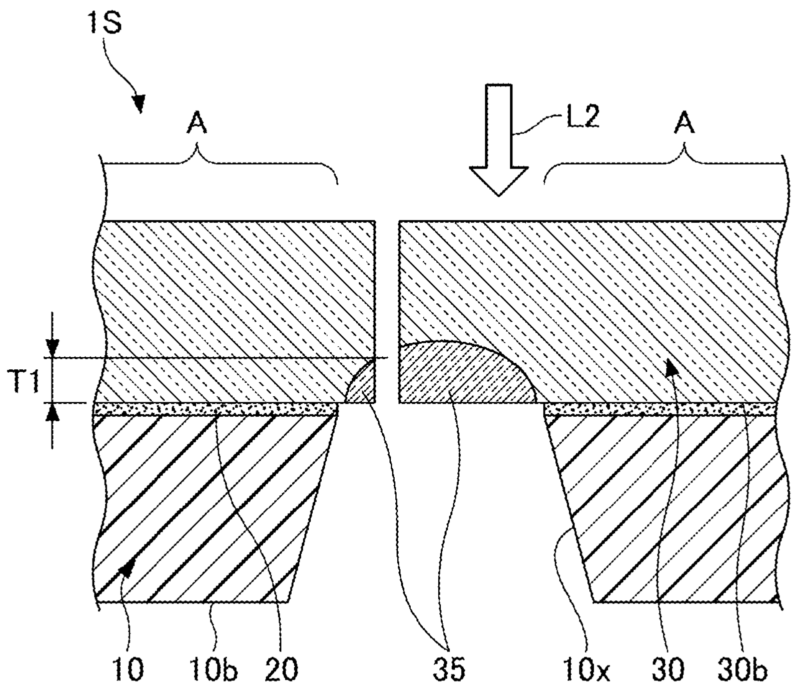
FIG. 9 illustrates a production process of the multi-layered structure according to the first embodiment (part 6).

Next, as illustrated in FIG. 8, the outer peripheral portion of each of the product areas A of the multi-layered structure 1S is irradiated with laser light L2 from a position facing the top face 30*a* of the glass layer 30. For example, the laser light L2 is irradiated in dots at predetermined intervals along a lattice of the outer peripheral portion of each of the product areas A as illustrated in FIG. 4. As illustrated in FIG. 9, the laser light L2 is irradiated until the glass layer 30 is cut and the product areas A are separated into individual sections. For the irradiation of the laser light L2, a femtosecond laser or a carbon dioxide laser can be used.

When a femtosecond laser is used, the diameter of one dot becomes from about 0.5 μm through about 2 μm, and the intervals between the dots next to each other becomes from about 0 μm through about 2 μm. In other words, the dots next to each other may overlap each other, with no interval therebetween. When a carbon dioxide laser is used, the diameters or intervals of the dots become ten times or more those obtained when a femtosecond laser is used. Considering processability of the glass layer 30, a femtosecond laser is preferably used in this step.

As illustrated in FIG. 8, the cross-sectional shape of the fusion layer 35 is approximately left-right symmetrical. Thus, by the irradiation of the laser light L2 at a position closer to the product area A than to the center of the fusion layer 35, it is possible to cut a thin portion of the fusion layer 35. As a result, as illustrated in FIG. 9, the thickness T1 of the fusion layer 35 remaining in the product area A becomes thinner. In this step, the glass layer 30 is cut at a position where the thickness T1 of the fusion layer 35 remaining in each of the product areas A after cutting is to become less than 3 μm. Subsequently, the glass layer 30 is irradiated and cut with the laser light L2 at a portion indicated by an arrow in FIG. 9 (i.e., a position where the thickness T1 of the fusion layer 35 remaining in each of the product areas A after cutting is to become less than 3 μm), thereby forming a plurality of multi-layered structures 1 through separation of the product areas A as illustrated in FIG. 4 into individual sections.

Note that, by adjusting the irradiation conditions of the laser light L1 with which the resin layer 10 is to be irradiated in the step of FIG. 6, it is possible to control the thickest portion of the fusion layer 35 formed in the step as illustrated in FIG. 7 to be less than 3 μm. In this case, regardless of a cut portion of the fusion layer 35, the thickness T1 of the fusion layer 35 after cutting becomes less than 3 μm. Therefore, it is possible to increase efficiency of the production process. Also, in this case, by cutting a vicinity of the thickest portion of the fusion layer 35, the two-step cutting operation along the arrow in FIG. 8 and the arrow in FIG. 9 can be a one-step cutting operation. This can also increase efficiency of the production process.

In this way, in the present embodiment, the glass layer 30 is cut so that the thickness of the fusion layer 35 remaining in the glass layer 30 becomes less than 3 μm. Thereby, a to-be-cut portion of the fusion layer 35, which is damaged by heat and readily forms cracks, becomes smaller, and thus it is possible to suppress cracks from forming in the glass layer 30 of the product area A. In other words, the multi-layered structure 1 that does not readily form cracks in the glass layer 30 can be realized.

The glass layer 30 is more preferably cut so that the thickness of the fusion layer remaining in the glass layer 30 becomes less than 2 μm. Further preferably, the glass layer 30 is cut so that the thickness of the fusion layer remaining in the glass layer 30 becomes less than 1 μm. Thereby, it is possible to further reduce a risk of formation of cracks in the glass layer 30.

Note that, when the glass layer 30 is processed using a femtosecond laser, a processed mark remains in a processed side face (cut face) of the glass layer 30. The processed mark is a linear groove extending in a laser irradiation direction; i.e., a longitudinal direction. The pitch of the grooves next to each other varies with conditions, but is about 1 μm. Also, the cross section of the groove in a transversal direction is generally semi-circular. The height of the processed mark (depth of the groove) is about 0.1 μm on average.

Modified Example 1 of the First Embodiment

Modified Example 1 of the first embodiment presents an example of the multi-layered structure including an outer peripheral portion of a different shape from that in the first embodiment. Note that, in Modified Example 1 of the first embodiment, description of the same components as those in the already described embodiment may be omitted.

Figure 10:
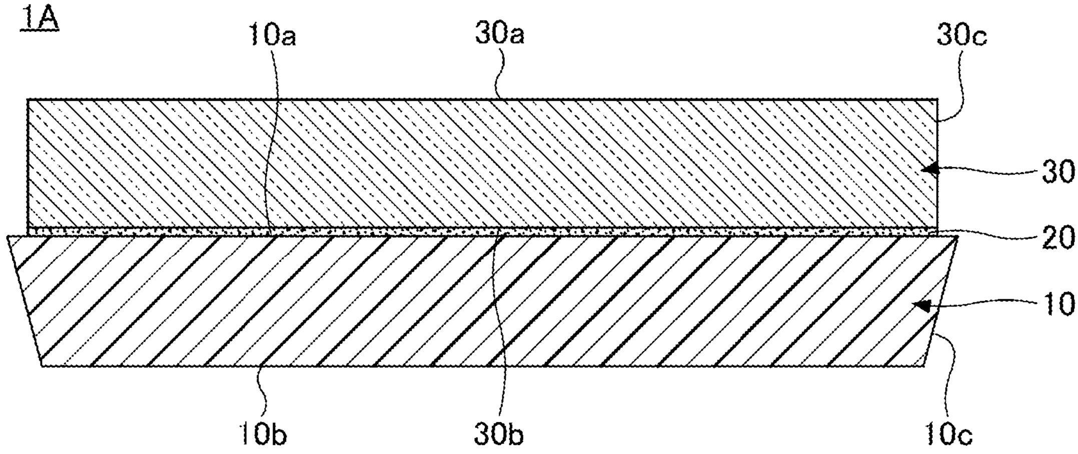
FIG. 10 is a cross-sectional view illustrating a multi-layered structure according to Modified Example 1 of the first embodiment.
Figure 11:
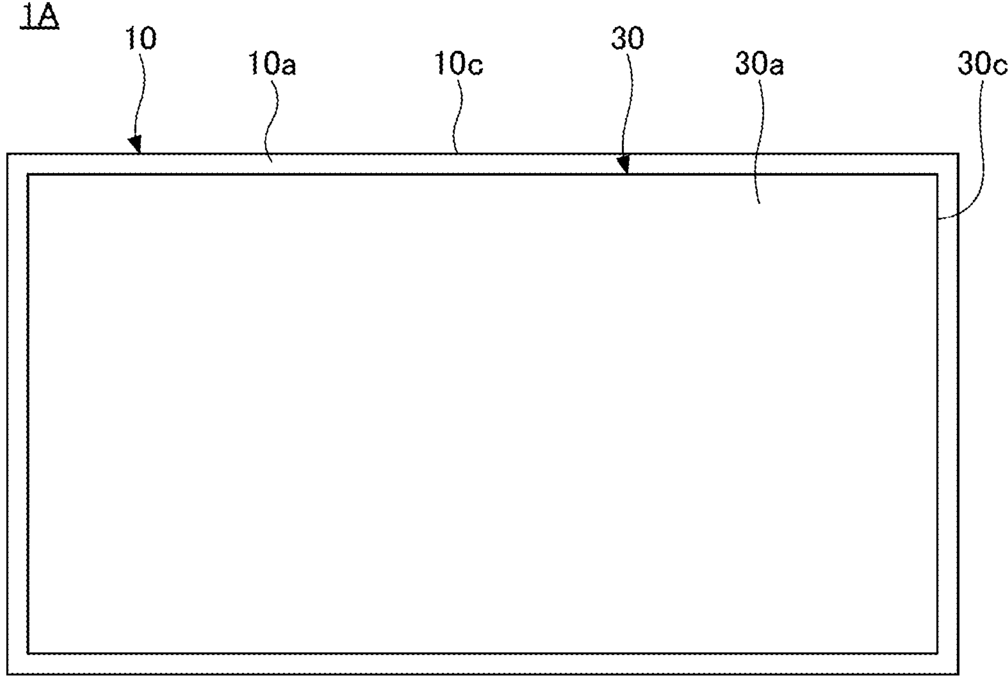
FIG. 11 is a plan view illustrating the multi-layered structure according to the first embodiment.

FIG. 10 is a cross-sectional view illustrating the multi-layered structure according to Modified Example 1 of the first embodiment. FIG. 11 is a plan view illustrating the multi-layered structure according to the first embodiment, with the multi-layered structure being viewed from the top face-facing side of the glass layer.

As illustrated in FIG. 10 and FIG. 11, a multi-layered structure 1A is different from the multi-layered structure 1, and the planar shape of the resin layer 10 is a rectangular shape and the planar shape of the glass layer 30 is a rectangular shape smaller than that of the resin layer 10. In the plan view, the outer peripheral portion of the top face 10*a* of the resin layer 10 is exposed around the side face 30*c* of the glass layer 30.

In accordance with a production method for the multi-layered structure 1A, however, the resin layer 10 and the glass layer 30 may be the same in size in the plan view. Alternatively, in the plan view, the outer peripheral portion of the top face 10*a* of the resin layer 10 may be exposed at only one side of the glass layer 30, or the outer peripheral portion of the top face 10*a* of the resin layer 10 may be exposed at two sides or three sides of the glass layer 30. Also, the entirety of the side face 10*c* is not necessarily an oblique face, and a part of the side face 10*c* may be substantially perpendicular to the top face 10*a* or the bottom face 10*b*.

Figure 12:
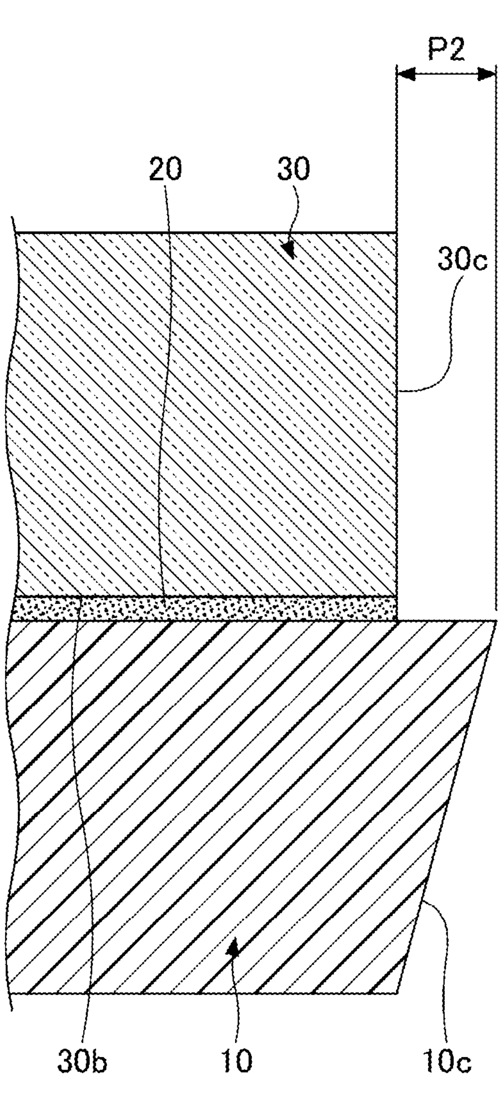
FIG. 12 is a partially enlarged cross-sectional view of an outer peripheral portion and its vicinity of the multi-layered structure according to Modified Example 1 of the first embodiment.

FIG. 12 is a partially enlarged cross-sectional view of the outer peripheral portion and its vicinity of the multi-layered structure according to Modified Example 1 of the first embodiment. As illustrated in FIG. 12, in the multi-layered structure 1A, the fusion layer 35 is not formed in the glass layer 30. Similar to the case of the multi-layered structure 1, the fusion layer 35 is formed when the resin layer 10 is irradiated with the laser light during the production process of the multi-layered structure 1A. However, the fusion layer 35 is completely removed during the production process of the multi-layered structure 1A, and does not remain in the glass layer 30.

Also, in the multi-layered structure 1A, the outer peripheral portion of the resin layer 10 projects, in a horizontal direction, from the side face 30*c* of the glass layer 30. An amount of projection P2 of the outer peripheral portion of the resin layer 10 from the side face 30*c* of the glass layer 30 is preferably less than 10 μm. When the amount of projection P2 is less than 10 μm, an impact of heat to the outer peripheral portion of the resin layer 10 upon cutting of the glass layer 30 with the laser light is reduced. Therefore, it is possible to suppress color fading from occurring in the outer peripheral portion of the resin layer 10. Note that, the amount of projection P2 may be 0 μm. In other words, in the plan view, the outer edge of the resin layer 10 may match the outer edge of the glass layer 30.

Figure 13:
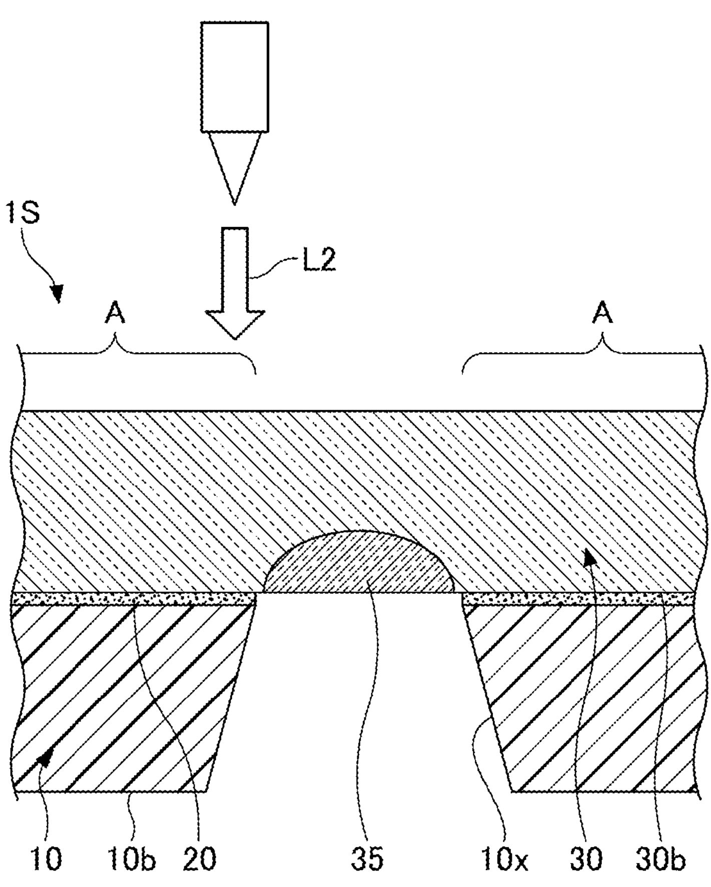
FIG. 13 illustrates a production process of the multi-layered structure according to Modified Example 1 of the first embodiment (part 1).
Figure 14:
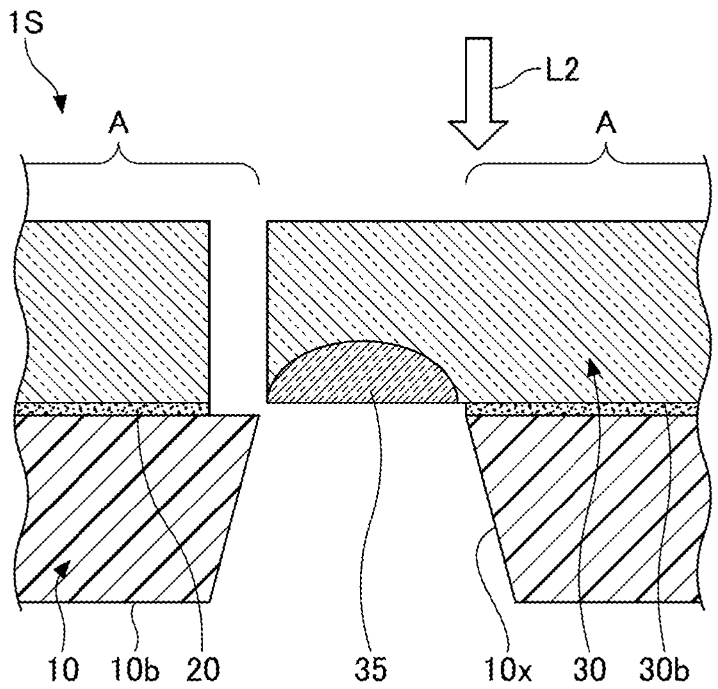
FIG. 14 illustrates a production process of the multi-layered structure according to Modified Example 1 of the first embodiment (part 2).

FIG. 13 and FIG. 14 illustrate a production process of the multi-layered structure according to Modified Example 1 of the first embodiment. Referring to FIG. 13 and FIG. 14, the production process of the multi-layered structure will be described, focusing on a cutting step using a laser. First, similar steps to the steps as illustrated in FIG. 4 to FIG. 7 of the first embodiment are performed. Subsequently, as illustrated in FIG. 13, the outer peripheral portion of each of the product areas A is irradiated with the laser light L2 from a position facing the top face 30*a* of the glass layer 30. For example, the laser light L2 is irradiated in dots at predetermined intervals along a lattice of the outer peripheral portion of each of the product areas A as illustrated in FIG. 4. For the irradiation of the laser light L2, a femtosecond laser or a carbon dioxide laser can be used, with a femtosecond laser being preferably used as described above.

In Modified Example 1 of the first embodiment, the irradiation position of the laser light L2 is set so as not to overlap the bottom face of the through-hole 10*x* in the plan view. Thereby, it is possible to cut the glass layer 30 at a position where the fusion layer 35 is absent. Therefore, as illustrated in FIG. 14, after the glass layer 30 has been cut, the fusion layer 35 does not remain in the glass layer 30 of the product area A.

Also, as illustrated in FIG. 14, after the cutting of the glass layer 30, the outer peripheral portion of the resin layer 10 projects from the side face 30*c* of the glass layer 30. An amount of projection of the outer peripheral portion of the resin layer 10 from the side face 30*c* of the glass layer 30 is as described above. Subsequently, the glass layer 30 is irradiated and cut with the laser light L2 at a portion indicated by an arrow in FIG. 14, thereby forming a plurality of multi-layered structures 1A through separation of the product areas A as illustrated in FIG. 4 into individual sections.

In this way, the resin layer 10 and the glass layer 30 may be cut so that the outer peripheral portion of the resin layer 10 projects from the side face 30*c* of the glass layer 30. In this case, the glass layer 30 can be cut so that the fusion layer 35, which is damaged by heat and readily forms cracks, does not remain on the product area A side. Therefore, it is possible to suppress cracks from forming in the glass layer 30 of the product area A.

Modified Example 2 of the First Embodiment

Modified Example 2 of the first embodiment is an example of the multi-layered structure in which the resin layer includes a plurality of layers. Note that, in Modified Example 2 of the first embodiment, description of the same components as those in the already described embodiments may be omitted.

Figure 15:
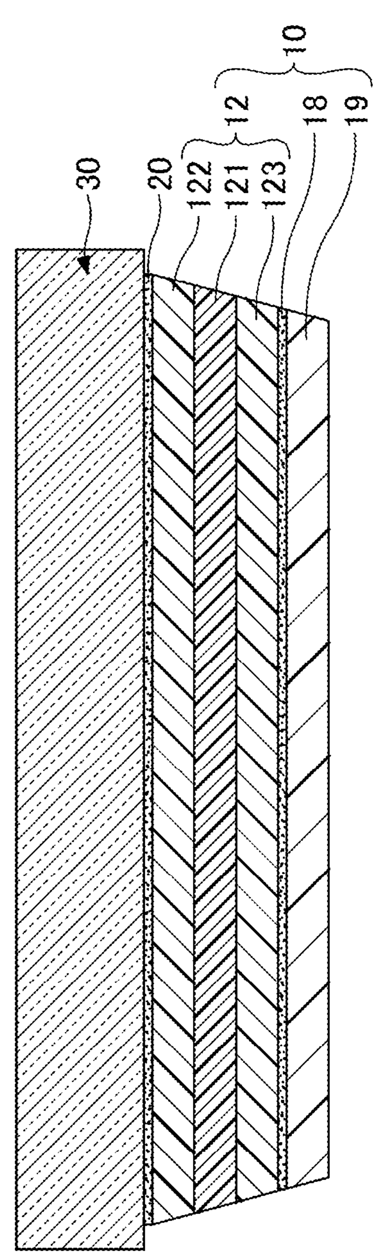
FIG. 15 is a cross-sectional view illustrating a multi-layered structure according to Modified Example 2 of the first embodiment.

FIG. 15 is a cross-sectional view illustrating the multi-layered structure according to Modified Example 2 of the first embodiment. As illustrated in FIG. 15, the multi-layered structure 1B is different from the multi-layered structure 1 (see, for example, FIG. 1) in that the resin layer 10 includes a plurality of layers.

The resin layer 10 includes a polarizing plate 12, a tacky agent layer 18, and a release film 19 in the order mentioned, from the adhesive layer 20 side. However, the resin layer 10 may further include other layers. For example, the resin layer 10 can include a phase difference layer between the polarizing plate 12 and the tacky agent layer 18. However, the other layers are not limited thereto.

An elastic modulus of the resin layer 10 is preferably from 0.1 GPa through 8.0 GPa, more preferably from 0.2 GPa through 7.0 GPa, and further preferably from 0.3 GPa through 5.0 GPa. In the present specification, the elastic modulus can be measured using an autograph under the following conditions.

[Measurement Method of Elastic Modulus]

Measurement temperature: 23° C.

Sample size: 2 cm wide, 15 cm long

Inter-chuck distance: 10 cm

Tension speed: 10 mm/min

The polarizing plate 12 is disposed on the adhesive layer 20 side. The polarizing plate 12 includes a polarizer 121, a first protective film 122, and a second protective film 123. The first protective film 122 is disposed on the adhesive layer 20 side of the polarizer 121, and the second protective film 123 is disposed on the tacky agent layer 18 side of the polarizer 121.

The release film 19 is disposed via the tacky agent layer 18 on an opposite side of the second protective film 123 from the polarizer 121.

Hereinafter, the components of the resin layer 10 will be described in more detail.

[Polarizing Plate]

A thickness of the polarizing plate 12 is preferably from 5 μm through 300 μm, more preferably from 10 μm through 250 μm, further preferably from 25 μm through 200 μm, and particularly preferably from 25 μm through 100 μm.

The elastic modulus of the polarizing plate 12 is preferably 1 GPa or higher, more preferably from 1 GPa through 10 GPa, further preferably from 2 GPa through 7 GPa, and particularly preferably from 2 GPa through 5 GPa. Within such ranges, the multi-layered structure 1B having excellent puncture resistance can be obtained.

No particular limitation is imposed on a shape of the polarizing plate 12, and an appropriate shape can be selected in accordance with the intended purpose. One example thereof is a rectangular shape having long sides and short sides. When the polarizing plate 12 is a rectangular shape, an absorption axis direction of the polarizer 121 included in the polarizing plate 12 is preferably substantially parallel to the long sides or the short sides of the polarizing plate 12. Note that, in the present specification, "substantially parallel" is a concept that includes not only a case in which two lines are strictly parallel but also a case in which an angle formed between the two lines is ±10° (preferably ±5°).

[Polarizer]

No particular limitation is imposed on the thickness of the polarizer 121, and an appropriate thickness can be selected in accordance with the intended purpose. The thickness of the polarizer 121 is typically from about 1 μm through about 80 μm. A thin polarizer may be used as the polarizer 121. In this case, the thickness of the polarizer 121 is preferably 20 μm or less, more preferably 15 μm or less, further preferably 10 μm or less, and particularly preferably 6 μm or less.

The polarizer 121 preferably exhibits absorption dichroism at a given wavelength in a wavelength range of from 380 nm through 780 nm. A single transmittance of the polarizer is preferably 40.0% or higher, more preferably 41.0% or higher, further preferably 42.0% or higher, and particularly preferably 43.0% or higher. A degree of polarization of the polarizer 121 is preferably 99.8% or higher, more preferably 99.9% or higher, and further preferably 99.95% or higher.

The polarizer 121 is preferably an iodine-based polarizer. More specifically, the above polarizer can be formed of a polyvinyl alcohol-based resin (hereinafter referred to as a "PVA-based resin") film containing iodine.

No particular limitation is imposed on the PVA-based resin that forms the PVA-based resin film, and an appropriate PVA-based resin can be selected in accordance with the intended purpose. Examples thereof include polyvinyl alcohol and ethylene-vinyl alcohol copolymers.

The polyvinyl alcohol is obtained through saponification of polyvinyl acetate. The ethylene-vinyl alcohol copolymer is obtained through saponification of an ethylene-vinyl acetate copolymer. A degree of saponification of the PVA-based resin is typically from 85% by mole through 100% by mole, preferably from 95.0% by mole through 99.95% by mole, and further preferably from 99.0% by mole through 99.93% by mole. The degree of saponification is determined in accordance with JIS K 6726-1994. By using the PVA-based resin having such a degree of saponification, it is possible to obtain a polarizer having excellent durability. When the degree of saponification is too high, the resulting product may be formed into a gel.

No particular limitation is imposed on an average degree of polymerization of the PVA-based resin, and the average degree of polymerization thereof can be appropriately selected in accordance with the intended purpose. The average degree of polymerization of the PVA-based resin is, for example, from 1000 through 10000, preferably from 1200 through 5000, and further preferably from 1500 through 4500. Note that, the average degree of polymerization is determined in accordance with JIS K 6726-1994.

Examples of a production method of the polarizer 121 include: method (I) of stretching a PVA-based resin film alone, followed by staining; and method (II) of stretching a stacked body (i) including a resin base material and a polyvinyl alcohol-based resin layer, followed by staining. The method (I) is a well-known customary method in the art, and thus detailed description thereof will be omitted.

The method (II) preferably includes a step of stretching the stacked body (i) including the resin base material and the polyvinyl alcohol-based resin layer formed on one side of the resin base material, followed by staining, thereby producing the polarizer on the resin base material. The stacked body (i) can be formed by coating a coating liquid containing the polyvinyl alcohol-based resin on the resin base material, followed by drying. Alternatively, the stacked body (i) may be formed by transferring the polyvinyl alcohol-based resin layer onto the resin base material. Details of the above production method (II) are described in, for example, Japanese Patent Application Publication No. 2012-73580, and this publication can be incorporated in the present specification as a reference.

[First and Second Protective Films]

No particular limitation is imposed on the first protective film 122 and the second protective film 123, and appropriate resin films can be selected in accordance with the intended purpose. Examples of materials of the first protective film 122 and the second protective film 123 include: polyester-based resins such as polyethylene terephthalate (PET); cellulose-based resin such as triacetylcellulose (TAC); cycloolefin-based resins such as norbornene-based resins; olefin-based resins such as polyethylene and polypropylene; and (meth)acrylic resins. Of these, polyethylene terephthalate (PET) is preferable. Note that, the "(meth)acrylic resin" refers to an acrylic resin and/or a methacrylic resin.

As the (meth)acrylic resin, for example, a (meth)acrylic resin having a glutarimide structure is used. The (meth) acrylic resin having the glutarimide structure (hereinafter may be referred to as a "glutarimide resin") is described in, for example, Japanese Patent Application Publication Nos. 2006-309033, 2006-317560, 2006-328329, 2006-328334, 2006-337491, 2006-337492, 2006-337493, 2006-337569, 2007-009182, 2009-161744, and 2010-284840. These descriptions can be incorporated in the present specification as references.

The first protective film 122 and the second protective film 123, and the polarizer 121 can be stacked on top of each other via given appropriate adhesive layers. The resin base material used during the production of the polarizer 121 is peeled off before or after stacking of the first protective film 122 and the second protective film 123, and the polarizer 121.

Thicknesses of the first protective film 122 and the second protective film 123 are preferably from 4 μm through 250 μm, more preferably from 5 μm through 150 μm, further preferably from 10 μm through 100 μm, and particularly preferably from 10 μm through 50 μm.

Elastic moduli of the first protective film 122 and the second protective film 123 are 1 GPa or higher, preferably from 1 GPa through 10 GPa, more preferably from 1.8 GPa through 7 GPa, and further preferably from 2 GPa through 5 GPa. Within such ranges, the multi-layered structure 1B having excellent puncture resistance can be obtained.

[Tacky Agent Layer]

The tacky agent layer 18 can be formed of a given appropriate tacky agent. As the tacky agent, for example, a tacky agent containing, as a base polymer, a polymer such as an acrylic polymer, a silicone-based polymer, polyester, polyurethane, polyamide, polyether, or a fluorine-based or rubber-based polymer is used. Preferably, an acrylic tacky agent is used. This is because the acrylic tacky agent has excellent optical transparency and exhibits tacky properties of appropriate wettability, aggregation property, and adhesiveness, and can be excellent in, for example, weather resistance and heat resistance. In particular, an acrylic tacky agent formed of an acrylic polymer having from 4 through 12 carbon atoms is preferable.

A thickness of the tacky agent layer 18 is preferably from 1 μm through 100 μm, more preferably from 3 μm through 80 μm, and further preferably from 3 μm through 50 μm. Within such ranges, when the multi-layered structure 1B is attached to an optical element (e.g., a liquid crystal cell) to form an optical stacked body, the formed optical stacked body has excellent flexibility and puncture resistance.

[Release Film]

The release film 19 can be formed of, for example, a resin such as polyethylene terephthalate (PET), polyethylene (PE), or polypropylene (PP). A thickness of the release film 19 is preferably from 5 μm through 125 μm, more preferably from 20 μm through 75 μm, and further preferably from 30 μm through 50 μm. The release film 19 is peeled off at the interface with the tacky agent layer 18 before the multi-layered structure 1B is attached to an optical element (e.g., a liquid crystal cell).

In this way, in the multi-layered structure, the resin layer 10 may be a single layer or include a plurality of layers. In either case, by cutting the glass layer 30 so that the thickness of the fusion layer 35 remaining in the glass layer 30 becomes less than 3 μm, it is possible to suppress cracks from forming in the glass layer 30. Also, in the case in which the resin layer 10 includes a plurality of layers, a method of cutting with a laser is similar to that in the first embodiment and the like.

Note that, in the multi-layered structure 1A according to Modified Example 1 of the first embodiment, a similar layer-stacked structure to that of the resin layer of the multi-layered structure 1B may be used.

Example 1

In Example 1, a multi-layered structure having the structure as illustrated in FIG. 15 was produced in accordance with the production process as illustrated in FIG. 4. to FIG. 9. The glass layer was cut using a femtosecond laser (output: about 40 W) so that the thickness of the fusion layer would be less than 3 μm. Then, studies were performed with respect to the amount of projection of the glass layer from the side face of the resin layer, and to the probability that cracks would form in the glass layer. Note that, thirty samples were produced, and all of the samples were measured.

In the multi-layered structure produced in Example 1, alkali-free glass was used as a material of the glass layer, and the thickness thereof was about 100 μm. A UV curable epoxy-based adhesive was used as a material of the adhesive layer, and the thickness thereof was about 1.5 μm. An acrylic resin was used as a material of the first protective film, and the thickness thereof was about 40 μm. A polyvinyl alcohol-based resin containing iodine was used as a material of the polarizer, and the thickness thereof was about 5 μm. An acrylic resin was used as a material of the second protective film, and the thickness thereof was about 40 μm. An acrylic polymer was used as a material of the tacky agent layer, and the thickness thereof was about 30 μm. Polyethylene terephthalate (PET) was used as a material of the release film, and the thickness thereof was about 38 μm.

Comparative Example 1

In Comparative Example 1, a multi-layered structure having a similar layer structure to that in Example 1 was produced through a similar production process to that in Example 1. However, the glass layer was cut using a femtosecond laser (output: about 40 W) so that the thickness of the fusion layer would be 10 μm or more. The number of samples and items of measurement are the same as those in Example 1.

Comparative Example 2

In Comparative Example 2, a multi-layered structure having a similar layer structure to that in Example 1 was produced through a similar production process to that in Example 1. However, the glass layer was cut using a femtosecond laser (output: about 40 W) so that the thickness of the fusion layer would be 5 μm or more and less than 9 μm. The number of samples and items of measurement are the same as those in Example 1.

Example 2

In Example 2, a multi-layered structure having the structure as illustrated in FIG. 1 was produced through a similar production process to that in Example 1. The glass layer was cut using a femtosecond laser (output: about 40 W) so that the thickness of the fusion layer would be less than 3 μm. The number of samples and items of measurement are the same as those in Example 1.

In the multi-layered structure produced in Example 2, alkali-free glass was used as a material of the glass layer, and the thickness thereof was about 100 μm. A UV curable epoxy-based adhesive was used as a material of the adhesive layer, and the thickness thereof was about 1.5 μm. A polyethylene terephthalate-based resin was used as a material of the resin layer, and the thickness thereof was about 150 μm.

Comparative Example 3

In Comparative Example 3, a multi-layered structure having a similar layer structure to that in Example 2 was produced through a similar production process to that in Example 1. However, the glass layer was cut using a femtosecond laser (output: about 40 W) so that thickness of the fusion layer would be 10 μm or more. The number of samples and items of measurement are the same as those in Example 1.

The results in Example 1, Example 2, and Comparative Examples 1 to 3 are summarized in Table 1.

TABLE 1

| | Configuration | Thickness of fusion layer | Amount of projection of glass layer | Probability of crack formation |
|---|---|---|---|---|
| Example 1 | FIG. 15 | <3 μm | <15 μm | 0% |
| Comparative Example 1 | FIG. 15 | ≥10 μm | ≥20 μm | 100% |
| Comparative Example 2 | FIG. 15 | from 5 through 9 μm | from 15 through 20 μm | 50% |
| Example 2 | FIG. 1 | <3 μm | <15 μm | 0% |
| Comparative Example 3 | FIG. 1 | ≥10 μm | ≥20 μm | 100% |

From Table 1, when the glass layer was cut so that the thickness of the fusion layer was less than 3 μm as in Examples 1 and 2, the amount of projection of the glass layer from the side face of the resin layer was less than 15 μm, and the probability of formation of cracks in the glass layer was 0%.

Meanwhile, it was found that as the thickness of the fusion layer became more than 3 μm as in Comparative Examples 1 to 3, and with the amount of projection of the glass layer from the side face of the resin layer becoming larger, the probability of formation of cracks in the glass layer became higher. In particular, it was found that when the thickness of the fusion layer was 10 μm or more, cracks always formed in the glass layer.

In this way, by cutting the glass layer so that the thickness of the fusion layer remaining in the glass layer would be less than 3 μm, it is possible to suppress cracks from forming in the glass layer. Also, the amount of projection of the glass layer from the side face of the resin layer is preferably less than 15 μm.

While preferable embodiments and the like have been described above in detail, the above-described embodiments and the like are non-limiting. Various modifications and substitutions can be added to the above-described embodiments and the like without departing from the scope of claims recited.

The present international application claims priority to Japanese Patent Application No. 2020-189244, filed Nov. 13, 2020, and the contents of Japanese Patent Application No. 2020-189244 are incorporated herein by reference in its entirety.

DESCRIPTION OF SYMBOLS

1, 1A, 1B, 1S multi-layered structure
10 resin layer

10*a*, 30*a* top face
10*b*, 30*b* bottom face
10*c*, 30*c* side face
10*x* through-hole
12 polarizing plate
18 tacky agent layer
19 release film
20 adhesive layer
30 glass layer
35 fusion layer
121 polarizer
122 first protective film
123 second protective film

The invention claimed is:

1. A multi-layered structure, comprising:
a resin layer;
a glass layer stacked via an adhesive layer on the resin layer; and
a fusion layer that is defined by a heat-damaged region of an outer peripheral portion of the glass layer, the heat-damaged region having a residual stress and formed on a glass layer side that faces the adhesive layer,
wherein the outer peripheral portion of the glass layer projects from a side face of the resin layer,
wherein an amount of projection of the outer peripheral portion of the glass layer from the side face of the resin layer is less than 15 μm,
wherein a thickness of the glass layer is 10 μm or more and 300 μm or less,
a thickness of the fusion layer is less than 3 μm, and
wherein the fusion layer is continuously exposed on a bottom face and a side face of the glass layer.

2. The multi-layered structure according to claim 1, wherein the side face of the resin layer is an oblique face that forms an angle of less than 90 degrees with a face of the resin layer facing the adhesive layer.

3. The multi-layered structure according to claim 1, wherein the resin layer includes a plurality of layers.

4. The multi-layered structure according to claim 3, wherein the plurality of layers include a polarizing plate including a polarizer.

5. The multi-layered structure according to claim 1, wherein the fusion layer extends annularly around the entire outer peripheral portion of the glass layer.

6. A method for producing the multi-layered structure according to claim 1, the method comprising:
providing a first multi-layered structure in which a plurality of product areas are defined, the first multi-layered structure including the resin layer and the glass layer that is stacked via the adhesive layer on the resin layer;
forming a through-hole in the resin layer by irradiating an outer peripheral portion of each of the product areas in the first multi-layered structure with laser light from a position facing the resin layer; and
forming a plurality of multi-layered structures through separation of the product areas into individual sections by irradiating the outer peripheral portion of each of the product areas in the first multi-layered structure with the laser light from a position facing the glass layer to cut the glass layer,
providing the thickness of the glass layer to be 10 μm or more and 300 μm or less,
in the forming the through-hole in the resin layer, the fusion layer is formed to have a predetermined thickness in a thickness direction of the glass layer from a face of the glass layer, the face of the glass layer being exposed to the through-hole,
in the forming the plurality of multi-layered structures, the glass layer is cut at a position where the thickness of the fusion layer is provided to become less than 3 μm, and
the multi-layered structure being among the plurality of multi-layered structures.

7. The method for producing the multi-layered structure according to claim 6, wherein in the forming the through-hole in the resin layer, the fusion layer is formed to have the thickness of less than 3 μm.

8. The method for producing the multi-layered structure according to claim 6, wherein in the forming the plurality of multi-layered structures, a femtosecond laser is used for irradiating the laser light.

9. The method for producing the multi-layered structure according to claim 6, wherein in the forming the through-hole in the resin layer, a carbon dioxide laser is used for irradiating the laser light.

* * * * *